US011683804B2

(12) United States Patent
Kumar

(10) Patent No.: US 11,683,804 B2
(45) Date of Patent: Jun. 20, 2023

(54) UPLINK ALLOCATION IN WIRELESS COMMUNICATION SYSTEMS

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/082,885

(22) Filed: Oct. 28, 2020

(65) Prior Publication Data

US 2022/0132494 A1    Apr. 28, 2022

(51) Int. Cl.
*H04W 72/21* (2023.01)
*H04L 5/00* (2006.01)
*H04W 74/08* (2009.01)
*H04W 52/02* (2009.01)

(52) U.S. Cl.
CPC ............ *H04W 72/21* (2023.01); *H04L 5/001* (2013.01); *H04L 5/0048* (2013.01); *H04W 52/0277* (2013.01); *H04W 74/0833* (2013.01); *H04L 5/0091* (2013.01)

(58) Field of Classification Search
CPC ......... H04W 72/0413; H04W 74/0833; H04W 72/21; H04W 52/0277; H04L 5/0048; H04L 5/001
See application file for complete search history.

(56) References Cited

U.S. PATENT DOCUMENTS

| 2012/0119792 A1* | 5/2012 | Wang ................. H04L 25/0278 327/108 |
| 2012/0122472 A1* | 5/2012 | Krishnamurthy ... H04L 27/0012 455/456.1 |
| 2013/0121271 A1* | 5/2013 | Chen ..................... H04L 1/1861 370/329 |

(Continued)

FOREIGN PATENT DOCUMENTS

| EP | 2415318 A1 | 2/2012 | |
| EP | 2443851 B1 * | 1/2018 | ............ H04L 5/001 |
| WO | WO-2021230795 A1 * | 11/2021 | |

OTHER PUBLICATIONS

International Search Report and Written Opinion—PCT/US2021/056065—ISA/EPO—dated Feb. 14, 2022.

*Primary Examiner* — Redentor Pasia
(74) *Attorney, Agent, or Firm* — Haynes and Boone LLP

(57) ABSTRACT

A method of wireless communication, the method including: identifying a resource block assignment for a non-data uplink resource within a set of resource blocks; determining a first range of resource blocks below the resource block assignment for the non-data uplink resource and identifying a second range of resource blocks above the resource block assignment for the non-data uplink resource; calculating a first bandwidth associated with the first range of resource blocks and calculating a second bandwidth associated with the second range of resource blocks; and configuring a first wireless communication device to work within a discrete bandwidth level sufficient to encompass a larger one of the first bandwidth and the second bandwidth, wherein the discrete bandwidth level is less than a full uplink bandwidth assigned by a network serving the first wireless communication device.

34 Claims, 7 Drawing Sheets

(56) References Cited

U.S. PATENT DOCUMENTS

| | | | |
|---|---|---|---|
| 2014/0105154 A1* | 4/2014 | Yang | H04W 72/042 |
| | | | 370/329 |
| 2016/0218900 A1* | 7/2016 | Smaini | H04B 1/04 |
| 2018/0076946 A1* | 3/2018 | Li | H04W 72/0446 |
| 2018/0279354 A1* | 9/2018 | Nory | H04W 72/23 |
| 2018/0287870 A1* | 10/2018 | Yerramalli | H04L 41/0816 |
| 2019/0069302 A1* | 2/2019 | Kumar | H04W 4/02 |
| 2019/0313348 A1* | 10/2019 | MolavianJazi | H04W 52/50 |
| 2020/0008162 A1* | 1/2020 | Dinan | H04W 52/365 |
| 2020/0092818 A1 | 3/2020 | Jiang et al. | |
| 2021/0136806 A1* | 5/2021 | Xiong | H04L 5/0094 |
| 2022/0394741 A1* | 12/2022 | Jiang | H04W 72/23 |
| 2023/0088011 A1* | 3/2023 | Wu | H04W 72/23 |

\* cited by examiner

| SCS (kHz) | 5MHz $N_{RB}$ | 10MHz $N_{RB}$ | 15MHz $N_{RB}$ | 20MHz $N_{RB}$ | 25MHz $N_{RB}$ | 30MHz $N_{RB}$ | 40MHz $N_{RB}$ | 50MHz $N_{RB}$ | 60MHz $N_{RB}$ | 80MHz $N_{RB}$ | 90MHz $N_{RB}$ | 100MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

FIG. 4

| Bandwidth | MSG1 Freq Start in activated BWP | PUCCH resource in mid freq domain |
|---|---|---|
| 100MHz | msg1-FrequencyStart <u>114</u> | startingPRB <u>159</u>, secondHopPRB <u>112</u>, |

FIG. 5

UPLINK ALLOCATION IN WIRELESS COMMUNICATION SYSTEMS

TECHNICAL FIELD

This application relates to wireless communication systems, and more particularly to uplink allocation in a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

Furthermore, a concern among both users of UE and designers of UE is energy use as it affects battery life. Generally, the more bandwidth assigned to a UE, the more power that UE uses, and the more drain on the battery of the EU. There is currently a need in the art for improved techniques to conserve energy use at the UE.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes: identifying a resource block assignment for a non-data uplink resource within a set of resource blocks; determining a first range of resource blocks below the resource block assignment for the non-data uplink resource and identifying a second range of resource blocks above the resource block assignment for the non-data uplink resource; calculating a first bandwidth associated with the first range of resource blocks and calculating a second bandwidth associated with the second range of resource blocks; and configuring a first wireless communication device to work within a discrete bandwidth level sufficient to encompass a larger one of the first bandwidth and the second bandwidth, wherein the discrete bandwidth level is less than a full uplink bandwidth assigned by a network serving the first wireless communication device.

In an additional aspect of the disclosure, an apparatus includes: a transceiver configured to: communicate with a network over an uplink channel; and a processor configured to: identify a resource block assignment for a non-data uplink resource within a set of resource blocks; determine a first range of resource blocks below the resource block assignment for the non-data uplink resource and identify a second range of resource blocks above the resource block assignment for the non-data uplink resource; and configure the transceiver to work within a discrete bandwidth level sufficient to encompass a larger one of the first range of resource blocks and the second range of resource blocks, wherein the discrete bandwidth level is less than a full uplink bandwidth assigned by the network.

In an additional aspect of the disclosure, a non-transitory computer-readable medium having program code recorded thereon includes: code for receiving an information element from a base station, the information element defining a resource block assignment for a non-data uplink resource; code for determining a first range of resource blocks below the resource block assignment and determining a second range of resource blocks above the resource block assignment; and code for tuning hardware within a user equipment to operate within a bandwidth level corresponding to a larger one of the first range or the second range and smaller than a full uplink bandwidth assignment assigned by the base station.

In an additional aspect of the disclosure, a user equipment includes: means for determining that the user equipment does not support non-contiguous physical UL shared channel (PUSCH) allocation; and means for tuning hardware of the user equipment to operate within a discrete bandwidth level less than a full uplink bandwidth assignment in response to the determining.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 illustrates a multitude of different discrete bandwidth levels of a UE, according to some aspects of the present disclosure.

FIG. 5 illustrates characteristics of an uplink as defined by a network, according to some aspects of the present disclosure.

DETAILED DESCRIPTION

Figure 1:
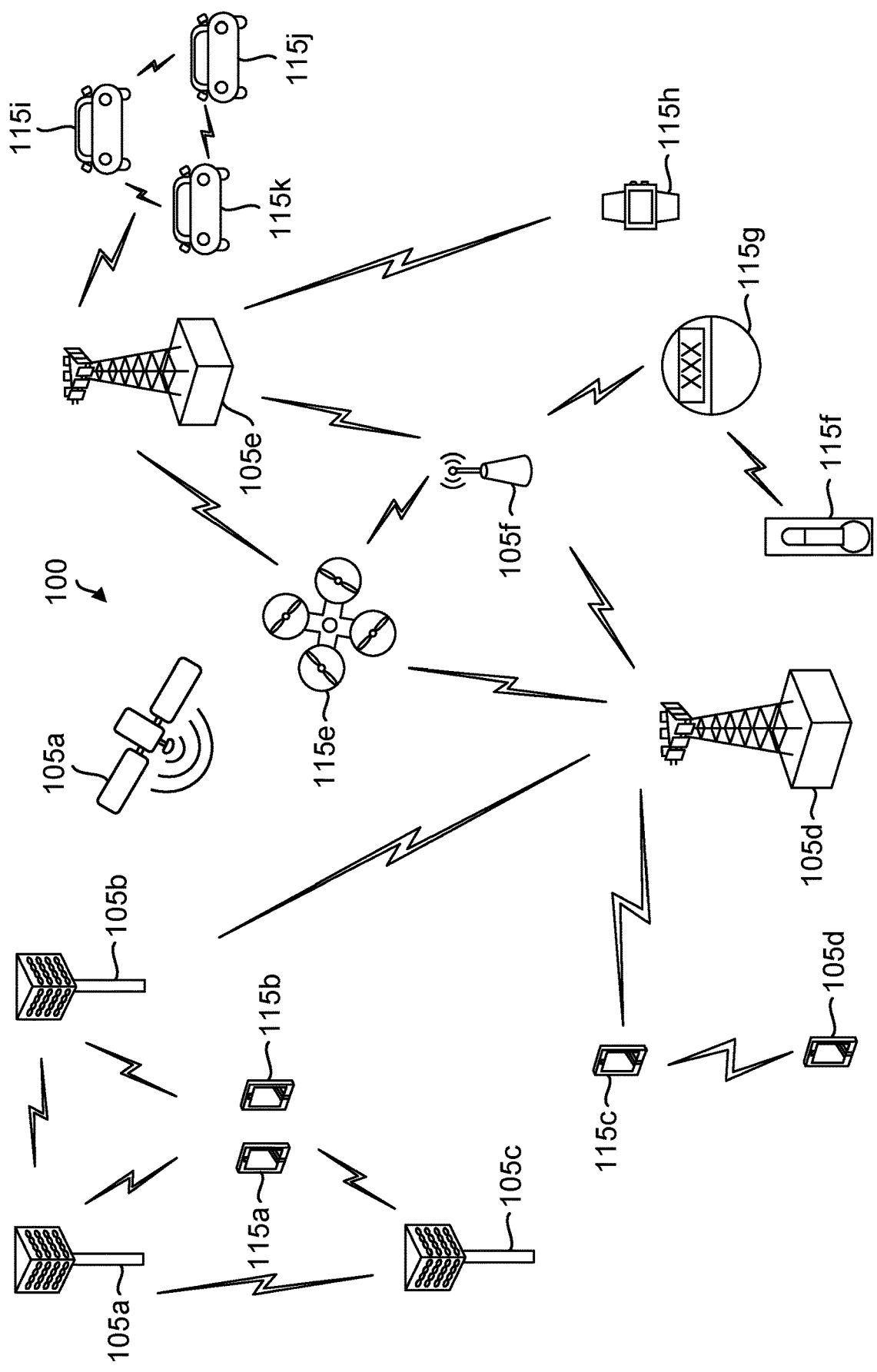
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-Advanced are considered in addition to development of the new radio technology for 5G NR networks. The 5G NR will be capable of scaling to provide coverage (1) to a massive Internet of things (IoTs) with a Ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Some NR technologies include techniques in which a network allocates bandwidth for uplink (UL) communications by the user equipment (UE). For instance, the full uplink bandwidth may be 100 MHz in some instances. That bandwidth may be shared with some non-data uplink resources, such as a random access channel (RACH), a physical UL control channel (PUCCH), a sounding reference signal (SRS), and the like. Non-data uplink resources, in this example, include signals and channels that are used for control data rather than user data.

By contrast, an example of an uplink resource that carries user data is a physical UL shared channel (PUSCH). In some instances, PUSCH may be assigned to non-contiguous resource blocks. Thus, if some resource blocks are used for non-data uplink resources, PUSCH may still be assigned to resource blocks both above and below the resource blocks that are assigned for the non-data uplink resources. In such instance, the PUSCH may use all or nearly all of the full uplink bandwidth assigned by the network.

In other examples, a UE may not support non-contiguous PUSCH allocation. In other words, in such instances, the network may only allocate contiguous resource blocks to PUSCH. In an instance in which the non-data resources are assigned resource blocks near the lower boundary or the upper boundary of the resource block range, contiguous PUSCH allocation may still use all or nearly all of the full uplink bandwidth assigned by the network.

However, some networks may assign resource blocks for one or more non-data uplink resources close to the center of the carrier bandwidth (i.e., close to the middle of the range of resource blocks). A UE that supports non-contiguous PUSCH allocation may then be assigned a set of non-contiguous resource blocks both above and below the resource blocks used for the non-data uplink resources. By contrast, a UE that does not support non-contiguous PUSCH allocation may have its uplink bandwidth cut approximately in half due to a PUSCH allocation that may only use resource blocks either above or below the non-data uplink resources for any given frame.

Various embodiments herein address a case in which a UE does not support non-contiguous PUSCH allocation. For instance, if the UE is forced to use less of its bandwidth than the full uplink bandwidth due to placement of the non-data resources, various embodiments may detect this configuration and perform techniques to reduce power usage.

For instance, some embodiments may include the UE detecting that it does not support non-contiguous PUSCH allocation (e.g., does not support PUSCH allocation type-0). The UE may then identify a resource block assignment for non-data uplink resources, such as RACH. For ease of illustration, there may be 100 resource blocks, 0-99, and the RACH may be assigned to resource block 50. The UE may then determine a first range (e.g., 0-49) of resource blocks below the resource block assignment and a second range (e.g., 51-99) of resource blocks above the resource block assignment for the non-data uplink resource. The UE may then calculate a first bandwidth associated with the first range of resource blocks as well as a second bandwidth associated with the second range of resource blocks. In one example, each of the resource blocks corresponds to a same amount of bandwidth, so that the range having the most resource blocks also corresponds to the larger bandwidth. In this example, the first range has 50 resource blocks, which is larger than the 49 resource blocks of the second range; thus, the first range corresponds to a larger bandwidth than does the second range.

Continuing with the example, the UE may then configure itself to work within a discrete bandwidth level that encompasses that largest bandwidth of the two ranges of resource blocks. For ease of illustration, if there are five discrete bandwidth levels including a level at 25 MHz and a level at 30 MHz, and if the bandwidth corresponding to the first range is 27 MHz, then the UE would configure itself to operate at the 30 MHz discrete bandwidth level. The discrete bandwidth level may be less than a full uplink bandwidth assigned by the network. For instance, if the full uplink bandwidth is 60 MHz, and if the UE configures itself to operate with a bandwidth of no more than 30 MHz, then it may save itself the power and performance difference associated with tuning to operate at the full 60 MHz bandwidth. Of course, these numbers are for example only, and the scope of embodiments is not limited to any number of resource blocks, bandwidth, or center frequency.

Aspects of the present disclosure may provide several benefits. For example, it is generally the rule for a wireless transmitter that current (and, therefore, power) scales with carrier bandwidth. Therefore, various embodiments that tune themselves to operate at no more than a discrete bandwidth level, which is less than the full uplink bandwidth, may save power. Similarly, it is generally the rule that noise increases as bandwidth increases. Thus, various embodiments that tune themselves to operate at less bandwidth than the full uplink bandwidth may reduce noise, as measured by such indices as signal-to-noise ratio (SNR), error vector magnitude (EVM), and the like. In other words, various embodiments may reduce power consumption, thereby increasing battery life for a wireless device as well as increasing performance by lowering noise. By contrast, a UE that tunes itself to use the full uplink bandwidth, even though it is only allocated a partial amount of that bandwidth, may use more power and experience more noise for the same amount of usable bandwidth, when compared to various embodiments described herein.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used. The actions of FIGS. 4, 5, and 8 may be performed by any of the UEs 115.

ABS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105b, 105d, and 105e may be regular macro BSs, while the BSs 105a and 105c may be macro BSs enabled with one of three dimension (3D), full dimension (FD), or massive MIMO. The BSs 105a and 105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a and 105c may serve the UEs 115a and 115b using 3D beamforming and coordinated spatial techniques, such as coordinated multipoint (CoMP) or multi-connectivity. The macro BS 105d may perform backhaul communications with the BSs 105a and 105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105. Additionally, BS 105b is shown as a non-terrestrial network (NTN) resource, such as a satellite that orbits the earth. In this example, BS 105b may include multiple antenna arrays, each array forming a relatively fixed beam. BS 105b may be configured as a single cell with multiple beams and BWPs, as explained in more detail below.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to RACH procedures, paging, control resource set (CORESET) for physical downlink control channel (PDCCH) monitoring, PUCCH, PUSCH, power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network. The BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In some aspects, the network 100 may operate over a high frequency band, for example, in a frequency range 1 (FR1) band or a frequency range 2 (FR2) band. FR1 may refer to frequencies in the sub-6 GHz range and FR2 may refer to frequencies in the mmWave range. To overcome the high path-loss at high frequency, the BSs 105 and the UEs 115 may communicate with each other using directional beams. For instance, a BS 105 may transmit SSBs by sweeping across a set of predefined beam directions and may repeat the SSB transmissions at a certain time interval in the set of beam directions to allow a UE 115 to perform initial network access. In the example of BS 105b (shown as an NTN resource), it may transmit SSBs on each of its beams at scheduled times, even if the beams do not steer. In some instances, each beam and its corresponding characteristics may be identified by a beam index. For instance, each SSB may include an indication of a beam index corresponding to the beam used for the SSB transmission. The UE 115 may determine signal measurements, such as reference signal received power (RSRP) and/or reference signal received quality (RSRQ), for the SSBs at the different beam directions and select a best DL beam. The UE 115 may indicate the selection by transmitting a physical random access channel (PRACH) signal (e.g., MSG1) using PRACH resources associated with the selected beam direction. For instance, the SSB transmitted in a particular beam direction or on a particular beam may indicate PRACH resources that may be used by a UE 115 to communicate with the BS 105 in that particular beam direction. After selecting the best DL beam, the UE 115 may complete the random access procedure (e.g., the 4-step random access or the 2-step random access) and proceed with network registration and normal operation data exchange with the BS 105.

In some aspects, the network 100 may be an IoT network and the UEs 115 may be IoT nodes, such as smart printers, monitors, gaming nodes, cameras, audio-video (AV) production equipment, industrial IoT devices, and/or the like. The transmission payload data size of an IoT node typically may be relatively small, for example, in the order of tens of bytes. In some aspects, the network 100 may be a massive IoT network serving tens of thousands of nodes (e.g., UEs 115) over a high frequency band, such as a FR1 band or a FR2 band.

Figure 2:
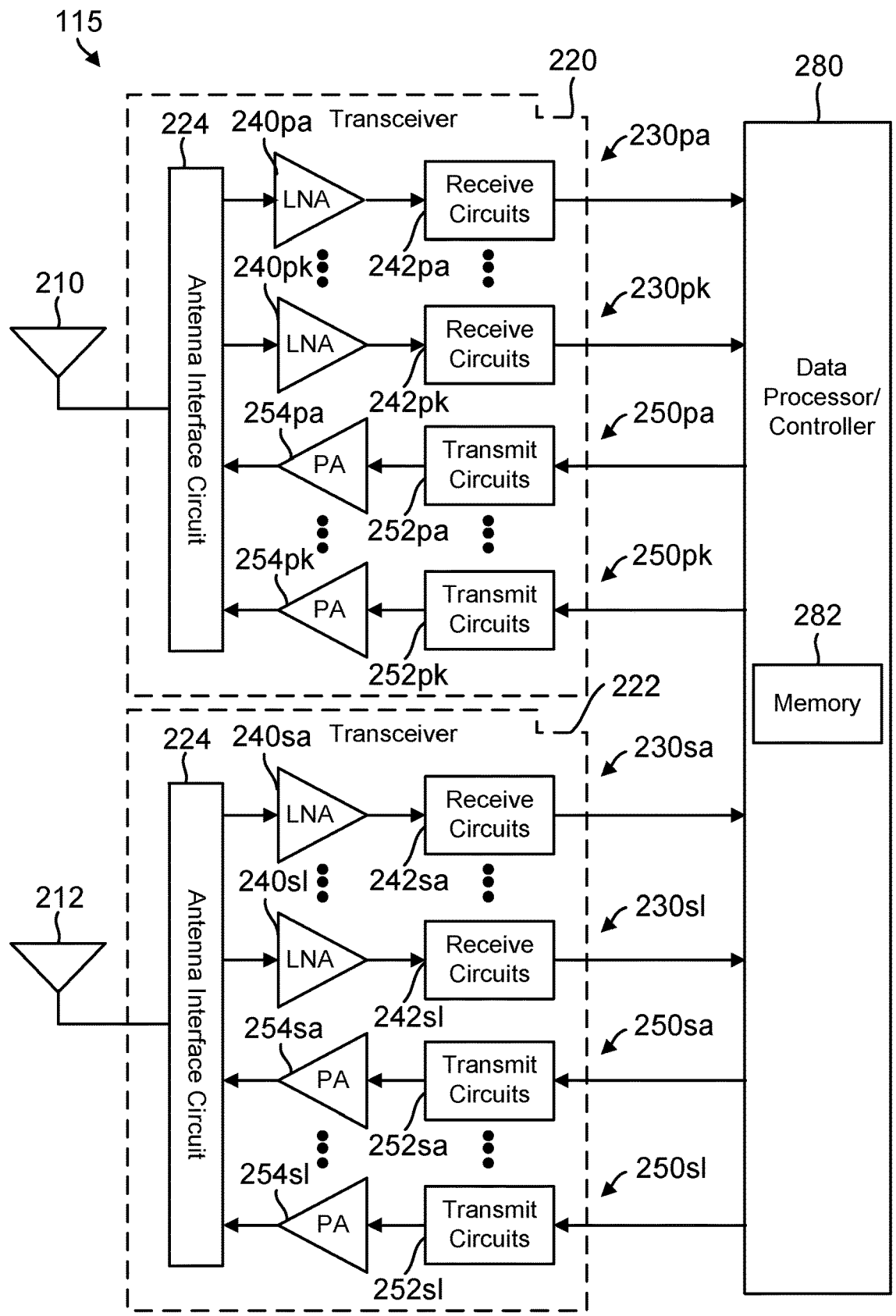
FIG. 2 illustrates a block diagram of a user equipment (UE) according to some aspects of the present disclosure.

FIG. 2 is an illustration of a block diagram of an exemplary design of UE 115 in FIG. 1. According to some aspects, UE 115 may perform the actions of FIGS. 4, 5, and 8, including configuring itself to work with in a discrete bandwidth level to encompass less than a full uplink bandwidth. Furthermore, such functionality may be stored as computer executable code at memory 282 and executed by the data processor/controller 280. As the data processor/controller 280 executes the code, it may implement the logic described at FIG. 8 as well as tune transmitter hardware in response. Such transmitter hardware is illustrated by all, or portions of, antenna interface circuit 224, power amplifiers 254, and transmit circuits 252.

In this exemplary design, wireless device 110 includes a transceiver 220 coupled to a primary antenna 210, a transceiver 222 coupled to a secondary antenna 212, and a data processor/controller 280. Transceiver 220 includes multiple (K) receivers 230pa to 230pk and multiple (K) transmitters 250pa to 250pk to support multiple frequency bands, multiple radio technologies, carrier aggregation, etc. Transceiver 222 includes L receivers 230sa to 230s1 and L transmitters 250sa to 250s1 to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 2, each receiver 230 includes a low noise amplifier (LNA) 240 and receive circuits 242. For data reception, antenna 210 receives signals from BSs and/or other transmitter stations and provides a received radio frequency (RF) signal, which may be routed through an antenna interface circuit 224 and presented as an input RF signal to a selected receiver. Antenna interface circuit 224 may include switches, duplexers, transmit filters, receive filters, matching circuits, etc. The description below assumes that receiver 230pa is the selected receiver. Within receiver 230pa, an LNA 240pa amplifies the input RF signal and provides an output RF signal. Receive circuits 242pa downconvert the output RF signal from RF to baseband, amplify and filter the downconverted signal, and provide an analog input signal to data processor 280. Receive circuits 242pa may include mixers, filters, amplifiers, matching circuits, an oscillator, a local oscillator (LO) generator, a phase locked loop (PLL), etc. Each remaining receiver 230 in transceivers 220 and 222 may operate in a similar manner as receiver 230pa.

In the exemplary design shown in FIG. 2, each transmitter 250 includes transmit circuits 252 and a power amplifier (PA) 254. For data transmission, data processor 280 processes (e.g., encodes and modulates) data to be transmitted and provides an analog output signal to a selected transmitter. The description below assumes that transmitter 250pa is the selected transmitter. Within transmitter 250pa, transmit circuits 252pa amplify, filter, and upconvert the analog output signal from baseband to RF and provide a modulated RF signal. Transmit circuits 252*pa* may include amplifiers, filters, mixers, matching circuits, an oscillator, an LO generator, a phase locked loop (PLL), etc. A PA 254*pa* receives and amplifies the modulated RF signal and provides a transmit RF signal having the proper output power level. The transmit RF signal may be routed through antenna interface circuit 224 and transmitted via antenna 210. Each remaining transmitter 250 in transceivers 220 and 222 may operate in a similar manner as transmitter 250*pa*.

Continuing with the example, when the data processor/ controller 280 issues command signals to configure the UE 115 to work within a discrete bandwidth level, it may cause various ones of the power amplifiers 254 to either power up or not power up, and it may configure the filters, mixers, matching circuits, oscillator, LO generator, and PLL to operate at a particular center frequency or range of frequencies to support the bandwidth level.

FIG. 2 shows an exemplary design of receiver 230 and transmitter 250. A receiver and a transmitter may also include other circuits not shown in FIG. 2, such as filters, matching circuits, etc. All or a portion of transceivers 220 and 222 may be implemented on one or more analog (ICs, RF ICs (RFICs), mixed-signal ICs, etc. For example, LNAs 240 and receive circuits 242 within transceivers 220 and 222 may be implemented on multiple IC chips, as described below. The circuits in transceivers 220 and 222 may also be implemented in other manners.

Data processor/controller 280 may perform various functions for wireless device 110. For example, data processor 280 may perform processing for data being received via receivers 230 and data being transmitted via transmitters 250. Controller 280 may control the operation of the various circuits within transceivers 220 and 222. A memory 282 may store program codes and data for data processor/controller 280. Data processor/controller 280 may be implemented on one or more application specific integrated circuits (ASICs) and/or other ICs.

Figure 3:
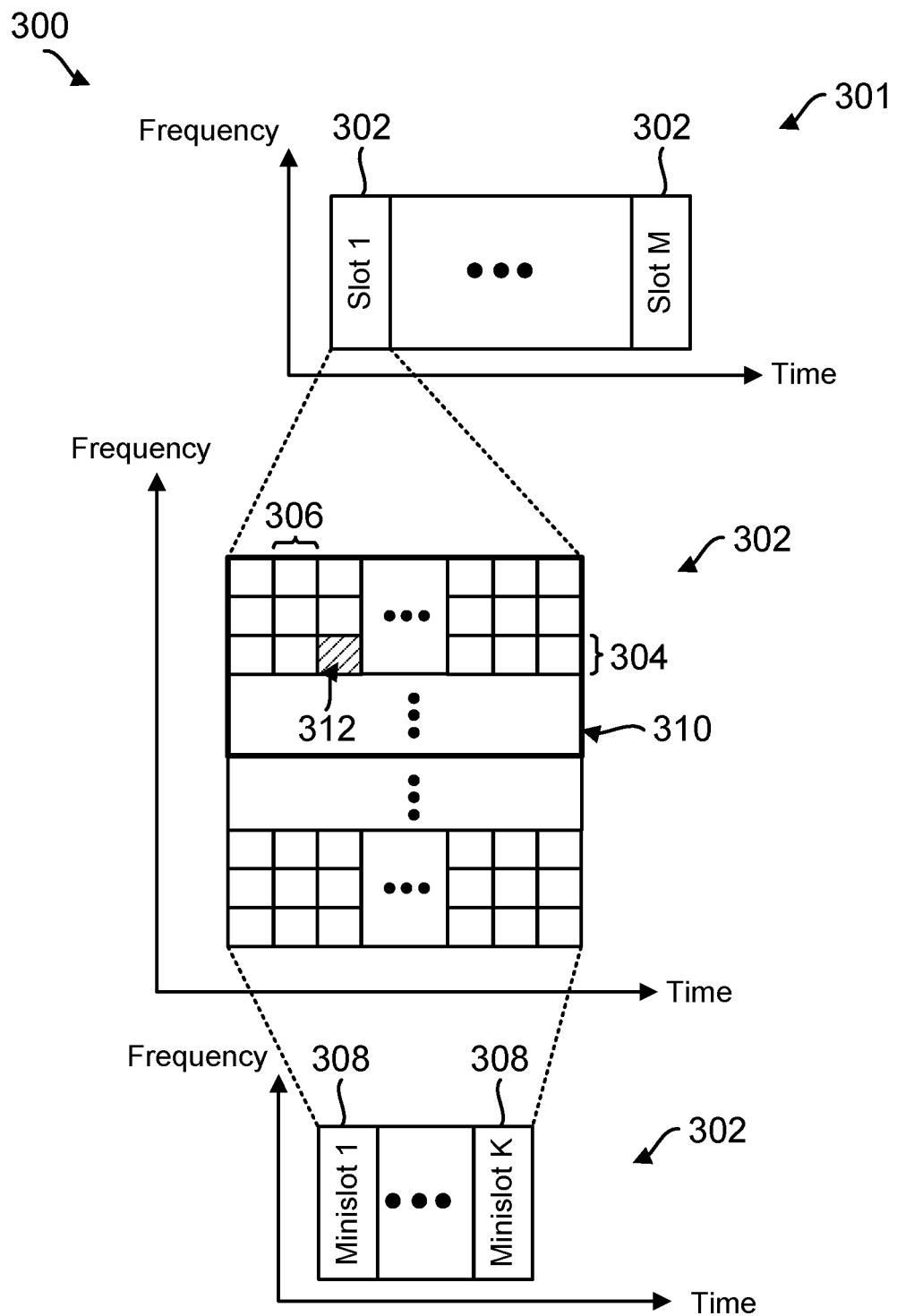
FIG. 3 illustrates a radio frame structure according to some aspects of the present disclosure.

FIG. 3 is a timing diagram illustrating a radio frame structure 300 according to some aspects of the present disclosure. The radio frame structure 300 may be employed by BSs such as the BSs 105 and UEs such as the UEs 115 in a network such as the network 100 for communications. In particular, the BS may communicate with the UE using time-frequency resources configured as shown in the radio frame structure 300. In FIG. 3, the x-axes represent time in some arbitrary units and the y-axes represent frequency in some arbitrary units. The radio frame structure 300 includes a radio frame 301. The duration of the radio frame 301 may vary depending on the aspects. In an example, the radio frame 301 may have a duration of about ten milliseconds. The radio frame 301 includes M number of slots 302, where M may be any suitable positive integer. In an example, M may be about 10.

Each slot 302 includes a number of subcarriers 304 in frequency and a number of symbols 306 in time. The number of subcarriers 304 and/or the number of symbols 306 in a slot 302 may vary depending on the aspects, for example, based on the channel bandwidth, the subcarrier spacing (SCS), and/or the cellular processor (CP) mode. One subcarrier 304 in frequency and one symbol 306 in time forms one resource element (RE) 312 for transmission. A resource block (RB) 310 is formed from a number of consecutive subcarriers 304 in frequency and a number of consecutive symbols 306 in time.

In an example, a BS (e.g., BS 105 in FIG. 1) may schedule a UE (e.g., UE 115 in FIGS. 1 and 2) for UL and/or DL communications at a time-granularity of slots 302 or mini-slots 308. Each slot 302 may be time-partitioned into K number of mini-slots 308. (The integer K may the same as or different from the integer K in FIG. 2.) Each mini-slot 308 may include one or more symbols 306. The mini-slots 308 in a slot 302 may have variable lengths. For example, when a slot 302 includes N number of symbols 306, a mini-slot 308 may have a length between one symbol 306 and (N−1) symbols 306. In some aspects, a mini-slot 308 may have a length of about two symbols 306, about four symbols 306, or about seven symbols 306. In some examples, the BS may schedule UE at a frequency-granularity of a resource block (RB) 310 (e.g., including about 12 subcarriers 304).

FIG. 4 illustrates an example table of transmission bandwidth configuration levels for an example UE, according to one embodiment. Specifically, the table of FIG. 4 shows a maximum transmission bandwidth for a configuration having a number N of resource blocks (RBs), wherein the number N may be the same as, or different from, the number N in FIG. 3.

The top row includes multiple entries, each one of the entries corresponding to a discrete bandwidth level that is supported by the UE. For instance, there are 12 total discrete bandwidth levels from 5 MHz up to 100 MHz. In some examples, the number of discrete bandwidth levels and their values is a function of the underlying hardware of the UE. In other words, the numbers shown in the table of FIG. 4 are for example only, and other UEs may have a different number of discrete bandwidth levels, different values for the different bandwidth levels, and different underlying hardware supporting those discrete bandwidth levels.

For an example UE, the discrete bandwidth levels that it supports are known at design time but also can be discovered using testing or simulation. An example of underlying hardware affecting a number of discrete bandwidth levels may include a number of PLLs that provide a sampling frequency for the transceiver of the UE. For instance, a higher bandwidth may require a higher sampling frequency, which may use a different PLL or multiple PLLs or other hardware to provide the higher sampling frequency versus a lower sampling frequency. The same is true with mixers, LOs, power amplifiers, upconverters, baseband and digital chains, and the like. Example hardware is described above with respect to FIG. 2. Put another way, in some examples, a higher discrete bandwidth level may require powering up additional hardware or using more current to drive existing hardware when compared to a lower discrete bandwidth level. Thus, tuning the example UE to support the 25 MHz discrete bandwidth level may use more power than tuning the UE to support the 5 MHz discrete bandwidth level. Similarly, tuning the UE to support the 100 MHz bandwidth level may use more power than tuning the UE to support the 25 MHz bandwidth level. Tuning the hardware in a UE to support a lower discrete bandwidth level may include powering some hardware, while not powering other hardware, reducing a clock frequency, reducing a voltage of operation or a current of operation, or the like.

Tuning the hardware may include selecting a mode of operation for a component, such as a power amplifier. For instance, it may be more efficient for the power amplifier to operate in an envelope tracking (ET) mode rather than in an average power tracking (APT) mode. In one example, a power amplifier may support ET up to a first bandwidth level but may use APT for bandwidth levels above the first bandwidth level and up to a full bandwidth level. Thus, if the discrete bandwidth level supports ET, then tuning the hardware may include putting the power amplifier in ET mode to take advantage of the power savings and lower noise of ET versus APT.

The leftmost column of the table of FIG. 4 shows different subcarrier spacings, and the rows to the right of the leftmost column show a number of RBs to support a bandwidth level using that subcarriers.

FIG. 5 is a table of example uplink characteristics for an example BS, according to one embodiment. For instance, a network may assign these characteristics, and a UE communicating with the base station may adapt to these characteristics. According to the example of FIG. 5, the full uplink bandwidth is 100 MHz, the RACH is assigned at resource block 114, and the PUCCH is assigned at blocks 112 and 159. Looking at the example of FIG. 4, 100 MHz of uplink bandwidth corresponds to 273 resource blocks having subcarriers of 30 kHz. Thus, for ease of illustration in this example, it is assumed that the uplink uses 30 kHz subcarriers, and the PUSCH will be assigned using some subset of the 273 resource blocks.

As the UE and the BS negotiate to set up communications, the UE may transmit a RRC UE capability message information element to the BS. In one example embodiment, the UE may parse its own RRC UE capability message information element to determine whether it supports non-contiguous PUSCH allocation by determining whether PUSCH allocation type-0 or type-1 are supported. Allocation type-1 does not support non-contiguous allocation, whereas allocation type-0 does support noncontiguous allocation. Continuing with the example embodiment, the BS may also parse the RRC UE capability message information element to determine the capabilities of the UE. Further as the UE and BS negotiate, the BS may send control messages to the UE to inform the UE of the bandwidth, the RACH assignment, and the PUCCH assignment, as well as to allocate PUSCH to a subset of the RBs.

Once the UE determines that it does not support non-contiguous PUSCH allocation, it may perform a power-saving technique by tuning itself to support some, but not all, of the full uplink bandwidth of 100 MHz. In the present example, the resource blocks are numbered 0-272, and the RACH is assigned at RB 114, and the PUCCH is assigned at 112 and 159. Thus, the BS may allocate a first range of resource blocks 0-111 or a second range of resource blocks 160-272 for the PUSCH during a given frame.

Given this constraint, the UE may then calculate a first bandwidth associated with the first range and calculate a second bandwidth associated with the second range. For the first range of resource blocks 0-111, bandwidth may be calculated by multiplying a number of subcarriers (e.g., 12) by a subcarrier spacing (e.g., 30 kHz) by a number of resource blocks in the range (112). Thus, for the first range of resource blocks, the bandwidth is 40.32 MHz. A similar calculation for the second range of resource blocks gives a bandwidth of 40.68 MHz. Taking a maximum of the two gives the larger bandwidth 40.68 MHz.

Now looking to FIG. 4, it has a discrete bandwidth level at 40 MHz and another discrete bandwidth level at 50 MHz. In order to support 40.68 MHz, the UE may configure its hardware at the 50 MHz discrete bandwidth level. This discrete bandwidth level is less than the full uplink bandwidth of 100 MHz, which is assigned by the network, as shown in FIG. 5. In other words, the UE may tune its hardware to use approximately one half of the available uplink bandwidth, which is generally expected to result in power savings and increased performance, as discussed above.

Figure 6:
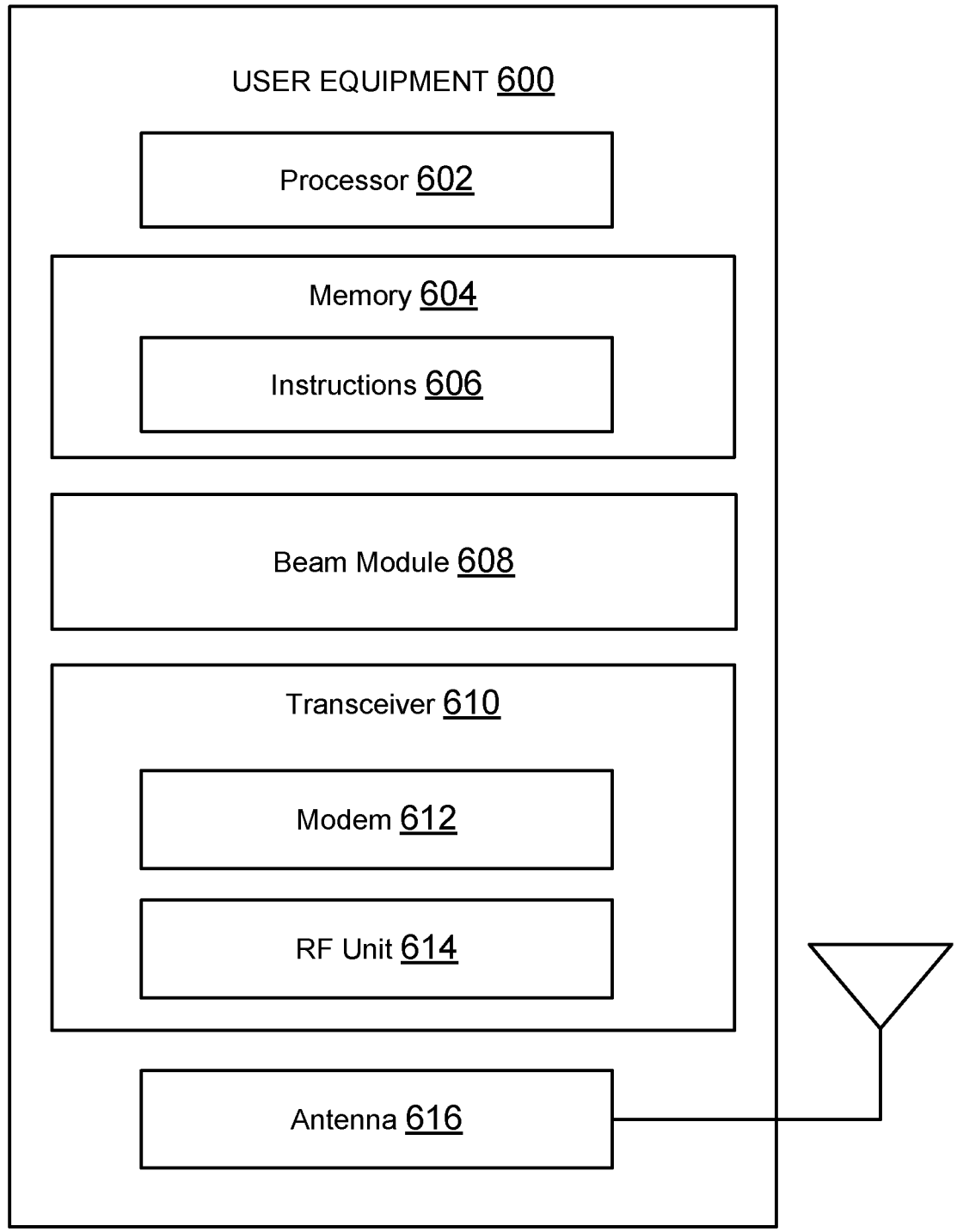
FIG. 6 is a block diagram of a user equipment (UE) according to some aspects of the present disclosure.

FIG. 6 is a block diagram of an exemplary UE 600 according to some aspects of the present disclosure. The UE 600 may be a UE 115 discussed above in FIGS. 1 and 2, and FIG. 6 represents another way of expressing the concepts described above with respect to FIG. 2. As shown, the UE 600 may include a processor 602, a memory 604, a beam module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 4, 5, and 8. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 608 may be implemented via hardware, software, or combinations thereof. For example, the beam module 608 may be implemented as a processor, circuit, and/or instructions 606 stored in the memory 604 and executed by the processor 602. In some instances, the beam module 608 can be integrated within the modem subsystem 612. For example, the beam module 608 can be implemented by a combination of software components (e.g., executed by a DSP or a general processor) and hardware components (e.g., logic gates and circuitry) within the modem subsystem 612. In some examples, the beam module 608 may be used for beam forming and beam recovery.

As shown, the transceiver 610 may include the modem subsystem 612 and the RF unit 614. The transceiver 610 can be configured to communicate bi-directionally with other devices, such as the BSs 105. The modem subsystem 612 may be configured to modulate and/or encode the data from the memory 604 and/or the beam module 608 according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PUCCH control information, PRACH signals, PUSCH data, beam refinement request, beam failure recovery (BFR) request, beam switch command, reference signals) from the modem subsystem 612 (on outbound transmissions) or of transmissions originating from another source such as a UE 115 or a BS 105. The RF unit 614 may be further configured to perform analog beamforming in conjunction with the digital beamforming via beam module 608. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., SSBs, PDCCH, PDSCH, beam switch command, CSI-RS resource configuration, CSI-RS reporting configuration, BFR resource configuration) to the beam module 608 for processing. The antennas 616 may include multiple antennas of similar or different designs in order to sustain multiple transmission links. The RF unit 614 may configure the antennas 616.

In an aspect, the UE 600 can include multiple transceivers 610 implementing different radio access technologies (RATs) (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
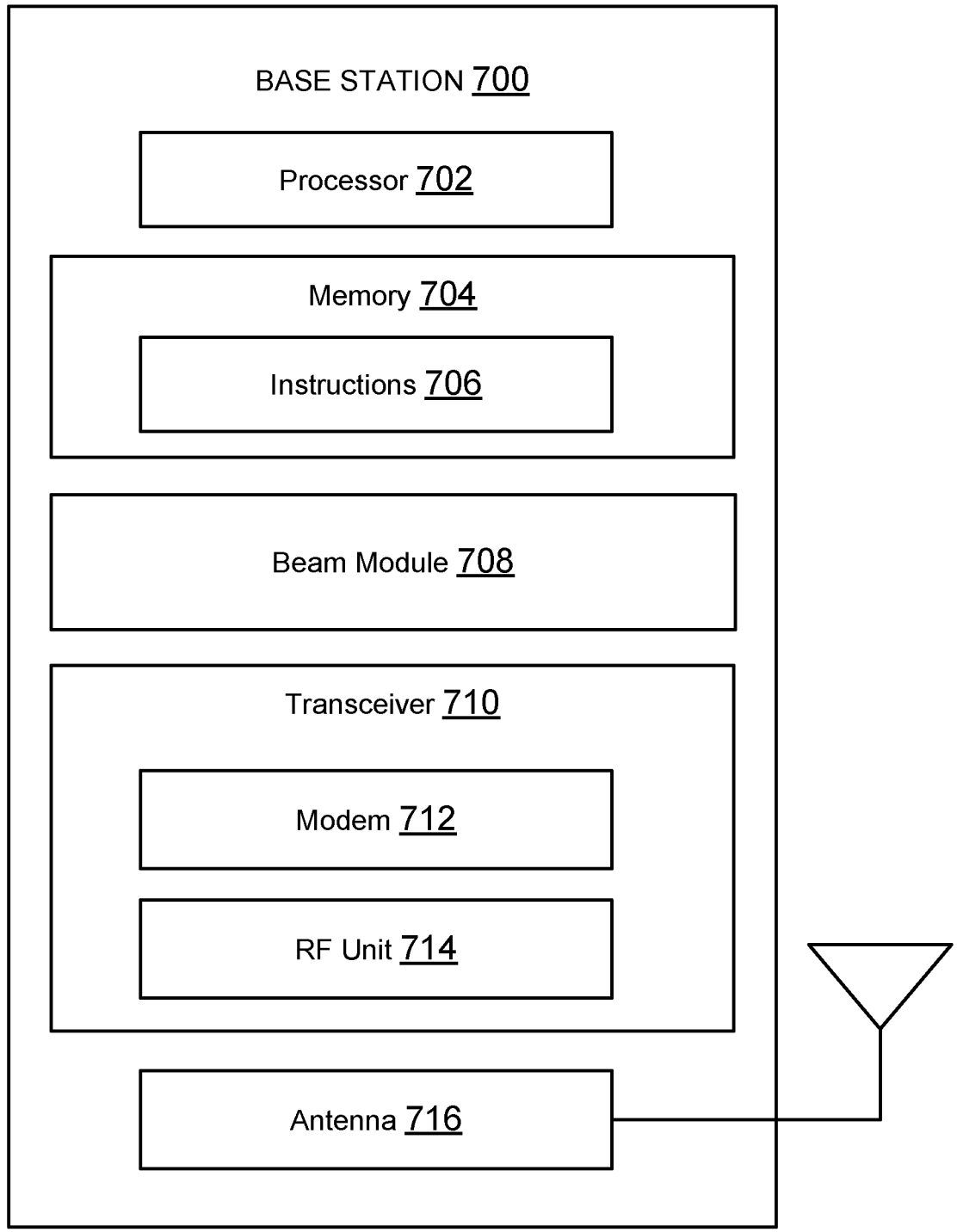
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 in the network 100 as discussed above in FIG. 1. A shown, the BS 700 may include a processor 702, a memory 704, a beam module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, assigning resource blocks and scheduling PUSCH. Instructions 706 may also be referred to as code, which may be interpreted broadly to include any type of computer-readable statement(s) as discussed above with respect to FIG. 6. The beam module 708 may be used beamforming and beam recovery.

As shown, the transceiver 710 may include the modem subsystem 712 and the RF unit 714. The transceiver 710 can be configured to communicate bi-directionally with other devices, such as the UEs 115 and/or 300 and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., SSBs, RMSI, MIB, system information block—SIB, frame based equipment—FBE configuration, PRACH configuration PDCCH, PDSCH) from the modem subsystem 712 (on outbound transmissions) or of transmissions originating from another source such as a UE 115, the node 315, and/or BS 700. The RF unit 714 may be further configured to perform analog beamforming in conjunction with the digital beamforming via beam module 708. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. The antennas 716 may be similar to the antennas 210, 212 discussed above. This may include, for example, transmission of information to complete attachment to a network and communication with a camped UE 115 or 215 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., PUCCH control information, PRACH signals, PUSCH data) to the beam module 708 for processing. The antennas 716 may include multiple antennas of similar or different designs in order to sustain multiple transmission links.

In an example, the transceiver 710 is configured to transmit, to a UE, system information including an FBE configuration indicating a plurality of frame periods, each including a gap period for contention at the beginning of the frame period, and communicate with the UE based on the FBE configuration, for example, by coordinating with the beam module 708.

In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

Figure 8:
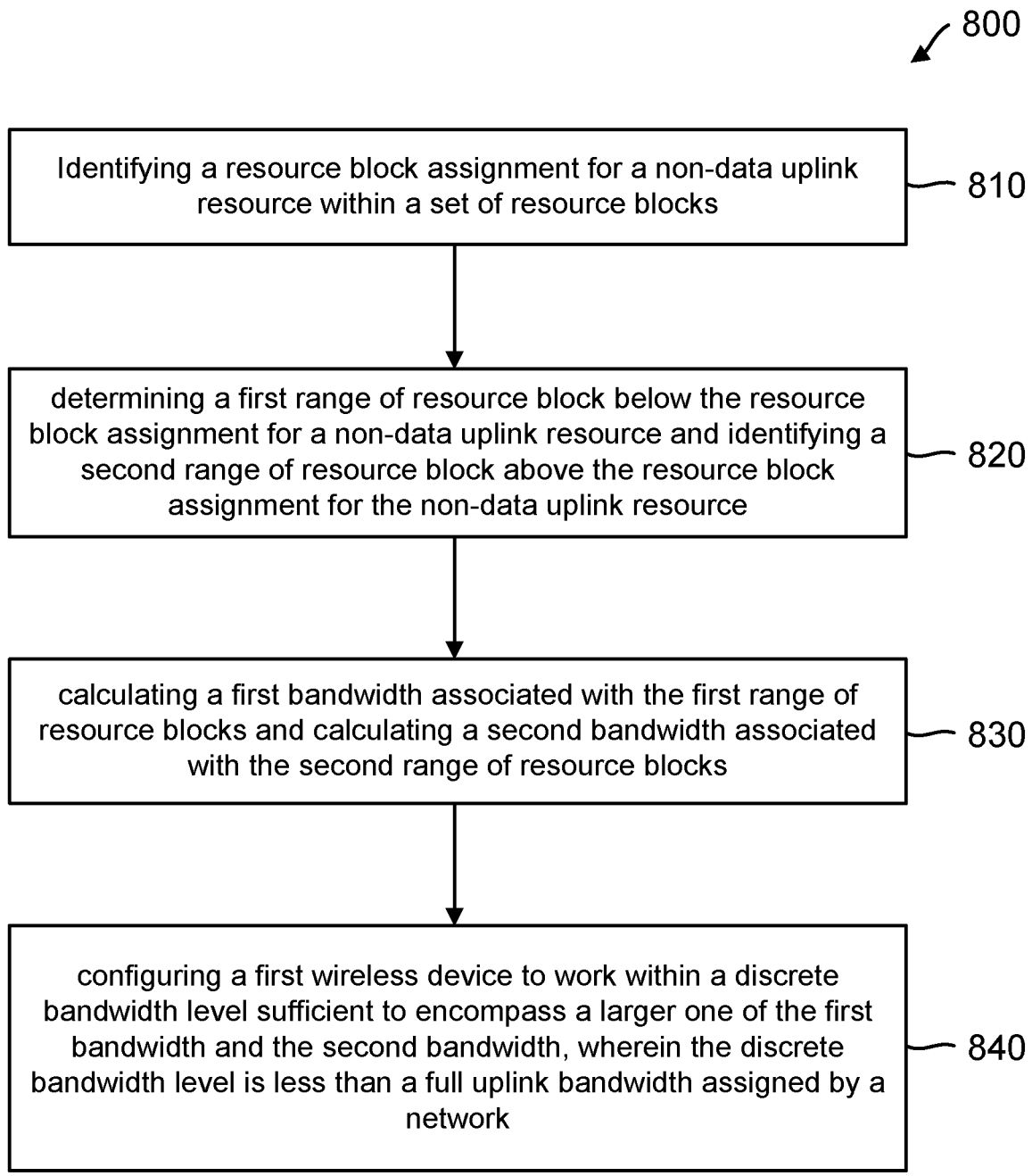
FIG. 8 is a flow diagram of a communication method according to some aspects of the present disclosure.

FIG. 8 is a flow diagram of a method 800 according to some aspects of the present disclosure. The method 800 may be implemented by any UE 115 in the network 100 (shown in FIG. 1). For instance, the UE 115 may utilize one or more components, such as the processor 602 or 280, the memory 604 or 282, the transceiver 610, 220, or 222, and the one or more antennas 616, 210, or 212, to execute the steps of method 800. As illustrated, the method 800 includes a number of enumerated steps, but implementations of the method 800 may include additional steps before, after, and in between the enumerated steps. In some aspects, one or more of the enumerated steps may be omitted or performed in a different order.

At action 810, the UE identifies a resource block assignment for a non-data uplink resource within a set of resource blocks. An example of a non-data uplink resource includes RACH, and the UE may identify the resource block assignment from a RACH information element sent by the BS as communications are established.

However, the scope of embodiments is not limited to any one type of non-data uplink resource. The UE may also identify a resource block assignment for a SRS, a PUCCH, or the like, using other information element sent by the BS. For instance, in the example of FIG. 5, the UE identified a resource block assignment for both RACH and PUCCH.

At action 820, the UE determines a first range of resource blocks below the resource block assignment for the non-data uplink resource. In the example of FIG. 5, the first range of resource blocks were below resource block 112, which was assigned to the RACH. In this example, a range of resource blocks being below a particular resource block includes the resource blocks that have subcarriers with a lower frequency than the subcarrier assigned to the non-data uplink resource.

Action 820 may also include determining a second range of resource blocks above the resource block assignment. In this example, a range of resource blocks being above a particular resource block includes the resource blocks that have subcarriers with a higher frequency than the subcarrier assigned to the non-data uplink resource. In the example of FIG. 5, the second range of resource blocks were above resource block 159, which was assigned to PUCCH. In an example in which the UE does not support non-contiguous PUSCH allocation, the first and second range of resource blocks may not both be used during a single frame, although each one may be used in different frames as assigned by the network. As a result, the PUSCH may be limited in bandwidth to some portion that is less than the full uplink bandwidth assigned by the network.

At action 830, the UE may calculate a first bandwidth associated with the first range of resource blocks. An example is given above with respect to FIGS. 4 and 5 in which a number of subcarriers is multiplied by an SCS and a number of resource blocks to provide a bandwidth.

Action 830 may also include calculating a second bandwidth associated with the second range of resource blocks, similar to calculating the first bandwidth, although perhaps with a different number of resource blocks. For instance, in the example of FIGS. 4 and 5, one range of resource blocks included 112 resource blocks, whereas the other range of resource blocks included 113 resource blocks and, thus, slightly more bandwidth.

In another implementation, the UE may simply select the range of resource blocks having the higher number of resource blocks and calculate the bandwidth of that. In other words, in some implementations, the UE may omit calculating a bandwidth associated with the smaller range of resource blocks.

At action 840, the UE configures itself to work within a discrete bandwidth level sufficient to encompass the largest of the first bandwidth and the second bandwidth. Put another way, the UE may configure itself to work within a discrete bandwidth level sufficient to encompass the larger range of resource blocks. Examples of discrete bandwidth levels are given above with respect to FIG. 4. Action 840 may further include the UE transmitting user data on the PUSCH within the discrete bandwidth level.

As explained above with respect to FIG. 4, discrete bandwidth levels may be a function of the underlying hardware of the UE, such that powering up different hardware components, setting operating modes, providing different clock frequencies, voltages, and currents may tune the UE for different discrete bandwidth levels. For instance, in some examples, tuning the hardware to support a discrete bandwidth level may include powering up some power amplifiers while leaving other power amplifiers powered down, setting an operating mode of the power amplifiers, setting a sampling frequency of a clock at an appropriate level, or the like.

Action 840 may include tuning the UE to work within an appropriate discrete bandwidth level that is less than the full uplink bandwidth that is assigned by the network. For instance, in an example in which the full uplink bandwidth is 100 MHz, and the UE tunes itself to work within a discrete bandwidth level of 50 MHz, the UE may be unable to provide the full 100 MHz bandwidth without re-tuning its hardware. However, as a result of being tuned to less than the full uplink bandwidth, the UE may benefit from lower power usage, lower noise, and better performance characteristics, such as may be measured by SNR and EVM. Action 840 may also include communicating with the network on a data channel, such as PUSCH, within the discrete bandwidth level.

The scope of embodiments is not limited to the actions of method 800, as other embodiments may add, omit, modify, or rearrange various actions as appropriate. For instance, the method 800 may be repeated each time the UE establishes communications with a BS or reestablishes communications with a BS.

Also, some embodiments may perform method 800 for each of the multiple ports supporting uplink in a multiple input multiple output (MIMO) device. For instance, the UE 115 of FIG. 2 is shown as having multiple inputs in multiple outputs, and the method 800 may be performed for each of those outputs supporting uplink communications. Also, method 800 may be repeated for each carrier in a carrier aggregation scheme.

In another example, method 800 may further include an action in which the UE determines whether it supports non-contiguous PUSCH allocation. Such action may include the UE parsing its own settings or parsing and RRC capability information element, which identifies whether either or both of PUSCH allocation type-0 type-1 and are supported. In fact, some embodiments may perform any combination of actions 810-840 conditionally on determining that PUSCH allocation type-0 is not supported by the UE.

Further, some embodiments may perform any combination of actions 810-840 on determining that some threshold has been met or exceeded. For instance, the UE may perform one or more of the actions 810-840 upon detecting that the UE battery has gone below a threshold or/and the UE uplink Block Error Ratio (BLER) has gone above a threshold.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A method of wireless communication, the method comprising:
   identifying a resource block assignment for a non-data uplink resource within a set of resource blocks;
   determining a first range of resource blocks and determining a second range of resource blocks, wherein the first range of resource blocks includes a first plurality of resource blocks that have subcarriers with a lower frequency than a subcarrier associated with the non-data uplink resource, and wherein the second range of resource blocks includes a second plurality of resource blocks that have subcarriers with a higher frequency than the subcarrier associated with the non-data uplink resource;
   calculating a first bandwidth associated with the first range of resource blocks and calculating a second bandwidth associated with the second range of resource blocks; and
   configuring a first wireless communication device to work within a discrete bandwidth level sufficient to encompass a larger one of the first bandwidth and the second bandwidth, wherein the discrete bandwidth level is less than a full uplink bandwidth assigned by a network serving the first wireless communication device.

2. The method of claim 1, wherein determining the first range of resource blocks is performed in response to determining that physical UL shared channel (PUSCH) allocation type-0 is not supported by the first wireless communication device.

3. The method of claim 1, wherein determining the first range of resource blocks is performed in response to determining that non-contiguous physical UL shared channel (PUSCH) allocation is not supported by the first wireless communication device.

4. The method of claim 1, further comprising:
   determining that non-contiguous physical UL shared channel (PUSCH) allocation is not supported by the first wireless communication device by parsing a Radio Resource Control (RRC) capability information element.

5. The method of claim 1, wherein the non-data uplink resource comprises an item selected from a list consisting of: a random access channel (RACH), a sounding reference signal (SRS), and a physical UL control channel (PUCCH).

6. The method of claim 1, wherein the non-data uplink resource does not carry user data.

7. The method of claim 1, wherein the non-data uplink resource carries control data.

8. The method of claim 1, wherein the non-data uplink resource comprises an item selected from a list consisting of: a signal and a channel.

9. The method of claim 1, wherein the first wireless communication device comprises user equipment (UE).

10. The method of claim 1, further comprising communicating user data with the network on a physical UL shared channel (PUSCH) within the discrete bandwidth level.

11. The method of claim 1, wherein configuring the first wireless communication device comprises tuning hardware within the first wireless communication device to support the discrete bandwidth level.

12. The method of claim 11, wherein tuning the hardware comprises supplying power to a power amplifier within the first wireless communication device.

13. The method of claim 11, wherein tuning the hardware comprises setting a sampling frequency of a clock within the first wireless communication device.

14. The method of claim 1, wherein configuring the first wireless communication device comprises tuning transceiver hardware within the first wireless communication device to not support the full uplink bandwidth.

15. The method of claim 1, wherein configuring the first wireless communication device is performed in response to determining that a battery level of the first wireless communication device has fallen below a threshold.

16. The method of claim 1, wherein configuring the first wireless communication device is performed in response to determining that an uplink Block Error Ratio (BLER) has risen above a threshold.

17. An apparatus comprising:
a transceiver configured to:
communicate with a network over an uplink channel; and
a processor configured to:
identify a resource block assignment for a non-data uplink resource within a set of resource blocks;
calculate a first bandwidth of a first range of resource blocks and calculate a second bandwidth of a second range of resource blocks, wherein the first range of resource blocks includes a first plurality of resource blocks that have subcarriers with a lower frequency than a subcarrier associated with the non-data uplink resource, and wherein the second range of resource blocks includes a second plurality of resource blocks that have subcarriers with a higher frequency than the subcarrier associated with the non-data uplink resource; and
configure the transceiver to work within a discrete bandwidth level sufficient to encompass a larger one of the first bandwidth and the second bandwidth, wherein the discrete bandwidth level is less than a full uplink bandwidth assigned by the network.

18. The apparatus of claim 17, wherein the apparatus comprises a user equipment (UE).

19. The apparatus of claim 17, wherein the transceiver comprises a clock, and wherein the processor is operable to configure the transceiver by setting a sampling frequency of the clock.

20. The apparatus of claim 17, wherein the uplink channel comprises a physical UL shared channel (PUSCH).

21. The apparatus of claim 20, wherein the processor is further configured to communicate with the network according to the discrete bandwidth level over the PUSCH.

22. The apparatus of claim 17, wherein the processor is further configured to:
parse a Radio Resource Control (RRC) capability information element to determine that non-contiguous physical UL shared channel (PUSCH) allocation is not supported by the apparatus.

23. The apparatus of claim 17, wherein the transceiver comprises a power amplifier, and wherein the processor is operable to configure the transceiver by setting the power amplifier to an envelope tracking mode.

24. An apparatus including a non-transitory computer-readable medium having program code recorded thereon, the program code when executed by a processor of the apparatus causes the apparatus to:
receive an information element from a base station, the information element defining a resource block assignment for a non-data uplink resource;
calculate a first bandwidth of a first range of resource blocks and calculating a second bandwidth of a second range of resource blocks, wherein the first range of resource blocks includes a first plurality of resource blocks that have subcarriers with a lower frequency than a subcarrier associated with the non-data uplink resource, and wherein the second range of resource blocks includes a second plurality of resource blocks that have subcarriers with a higher frequency than the subcarrier associated with the non-data uplink resource; and
tune hardware within a user equipment to operate within a bandwidth level corresponding to a larger one of the first bandwidth or the second bandwidth and smaller than a full uplink bandwidth assignment assigned by the base station.

25. The apparatus of claim 24, further comprising code which when executed by the processor causes the apparatus to:
communicate from the user equipment to the base station on a physical UL shared channel (PUSCH) according to the bandwidth level.

26. The apparatus of claim 24, further comprising code which when executed by the processor causes the apparatus to:
determine that the user equipment does not support non-contiguous physical UL shared channel (PUSCH) allocation.

27. The apparatus of claim 24, further comprising code which when executed by the processor causes the apparatus to:
determine that the user equipment does not support physical UL shared channel (PUSCH) allocation type-0.

28. The apparatus of claim 24, wherein tuning the hardware comprises:
provide power to a first subset of power amplifiers within the user equipment and for powering down a second subset of power amplifiers within the user equipment.

29. The apparatus of claim 24, wherein tuning the hardware comprises:
set a sampling frequency of a clock within the user equipment.

30. The apparatus of claim 24, wherein the non-data uplink resource comprises an item selected from a list consisting of: a random access channel (RACH), a sounding reference signal (SRS), and a physical UL control channel (PUCCH).

31. A user equipment comprising:
means for determining that the user equipment does not support non-contiguous physical UL shared channel (PUSCH) allocation;
means for calculating a bandwidth of a first range of resource blocks and for calculating a bandwidth of a second range of resource blocks, wherein a discrete bandwidth level is sufficient to encompass a bandwidth associated with a larger one of the first range and the second range, wherein the first range of resource blocks includes a first plurality of resource blocks that have subcarriers with a lower frequency than a subcarrier associated with a non-data uplink resource, and wherein the second range of resource blocks includes a second plurality of resource blocks that have subcarriers with a higher frequency than the subcarrier associated with the non-data uplink resource; and
means for tuning hardware of the user equipment to operate within the discrete bandwidth level, which is less than a full uplink bandwidth assignment in response to determining that the user equipment does not support non-contiguous PUSCH allocation.

32. The user equipment of claim 31, further comprising:
means for communicating over the PUSCH with a base station according to the discrete bandwidth level.

33. The user equipment of claim 31, wherein the hardware includes an item selected from a list consisting of: a plurality of power amplifiers, a mixer, a local oscillator, and a phase locked loop.

34. The user equipment of claim 31, wherein the means for determining that the user equipment does not support non-contiguous PUSCH allocation comprises means for parsing a Radio Resource Control (RRC) capability information element.

* * * * *